United States Patent [19]

Kondo

[11] 4,239,984
[45] Dec. 16, 1980

[54] SIGNAL SYSTEM

[75] Inventor: Isao Kondo, Hachioji, Japan

[73] Assignee: Olympus Optical Co., Ltd., Tokyo, Japan

[21] Appl. No.: 868,379

[22] Filed: Jan. 10, 1978

[30] Foreign Application Priority Data

Feb. 22, 1977 [JP] Japan ................................ 52/18956

[51] Int. Cl.³ .............................................. H03K 5/08
[52] U.S. Cl. ................................. 307/237; 307/252 J; 307/304; 307/353
[58] Field of Search ............... 307/237, 304, 311, 353, 307/251, 252 J

[56] References Cited

U.S. PATENT DOCUMENTS

| | | |
|---|---|---|
| 3,568,582 | 3/1971 | Uchida et al. |
| 3,603,811 | 9/1971 | Day et al. ............................. 307/237 |
| 3,603,813 | 9/1971 | Hall ..................................... 307/237 |
| 3,726,197 | 4/1973 | Hasegawa et al. |

*Primary Examiner*—John Zazworsky
*Attorney, Agent, or Firm*—Weinstein & Sutton

[57] ABSTRACT

A signal system includes a switching element which is turned on or off in response to an electrical signal. The signal system includes a field effect transistor which is arranged such that the drain current does not change in response to a variation in voltage across the source and the drain of the transistor, whereby every signal is applied to the switching element when a circuit voltage is applied to the switching element while a signal is prevented from being applied to the switching element when a circuit voltage is not applied to the switching element.

4 Claims, 9 Drawing Figures

SIGNAL SYSTEM

BACKGROUND OF THE INVENTION

The invention relates to a signal system.

In a signal system which deals with voltage signals of a very high and a very low magnitude, it may be sometimes desirable to accept both levels of signals while it may be desirable at other times not to accept any one of them. There is no problem in providing an arrangement to accept both signals. However, in view of the considerations of circuit components, it may be difficult to prevent both signals from being accepted. A signal of a low magnitude can be blocked, while a signal of much greater magnitude cannot be blocked.

Such difficulty may be illustrated by an auto strobe unit used in combination with a photographic camera. Referring to FIG. 1, there is shown a camera AC including a taking lens 1, and the light passing therethrough impinges upon and is reflected by either a shutter blind 2 or film surface 3 to be measured by a light receiving element 4. The output of the element 4 is utilized to control a shutter control system 5. When the control system 5 turns transistor 7 off, a back electromotive force is developed across an electromagnet 6, which is usually used to hold a second shutter blind. The back e.m.f. is fed to the control of an auto strobo unit AS from a pair of terminals $A_1$, $B_1$ in order to interrupt the flash illumination thereof. A strobo unit constructed in this manner will be referred to hereinafter as TTL auto strobo unit, which is known in the art.

The TTL auto strobo unit includes a circuit arrangement as shown in FIG. 4. Referring to this Figure, a discharge tube 20 is connected across a power source E through a flashlight circuit 21 of a known form including a trigger transformer $T_1$, diode $D_0$ and resistor $R_0$, the arrangement being such that a flashlight illumination is initiated when synchro contacts 22 are closed. A thyristor 23 is connected in series with the discharge tube 20 in order to interrupt the flashlight illumination from the discharge tube 20 when an extinction discharge tube 24 conducts to apply a back bias thereto through a commutating capacitor 25. The discharge tube 24 is connected with a transformer $T_2$, to which is also connected a closed loop circuit including a trigger capacitor 26 and another thyristor 27. The capacitor 26 is initially charged from the source E through a path including resistors $R_7$, $R_6$, diode 28 and a common line Cm, to which is connected a terminal $B_1$ which is adapted to be connected with a terminal $B_0$ provided on the part of the camera. The gate of the thyristor 27 is connected through diode 29 and resistor $R_5$ with a terminal $A_1$ which is adapted to be connected with an output terminal $A_0$ provided on the part of the camera, and the gate of thyristor 27 is also connected through resistor $R_2$ with the common line Cm. The terminal $A_1$ can be selectively connected with the output terminal $A_0$ of the camera or with the output terminal $D_0$ of an external photometric unit PD (see FIG. 1) which is associated with the auto strobo unit AS. The cathode of the thyristor 27 is connected with the common line Cm through diode 28, and is also connected through resistor $R_3$ with the emitter of transistor 30, the base of which is connected through diode 31 and resistor $R_5$ with the terminal $A_1$. A parallel combination of a Zener diode 32 and capacitor 33 is connected between the collector of transistor 30 and the common line Cm to provide a constant voltage source for the components such as transistor 30 when the charge is transferred from the capacitor 34 thereto as the synchro contacts 22 are closed. The capacitor 34 has been initially charged as well as the capacitor 26. It will be noted that the terminals $A_1$, $B_1$, resistors $R_2$, $R_3$, $R_4$ and $R_5$, thyristor 27, transistor 30 and diode 31 collectively form a signal system ST for interrupting the flashlight illumination from the strobo unit.

Referring to FIGS. 2(A), (B) and (C), there are shown the voltage applied to the auto strobo unit AS, indicated on the ordinate, plotted against the shutter operating time shown on the abscissa during several typical modes of operation. Specifically, FIG. 2(A) illustrates a normal strobo photographing operation, FIG. 2(B) a shutter operation with an exposure period on the order of 1/60 second which is close to a strobo photographing operation, and FIG. 2(C) a shutter operation with an exposure time less than 1/60 second, which is shown as a typical shutter period of 1/125 second.

Considering the shutter operation illustrated in FIG. 2(A) initially, a shutter release takes place at time $t_0$, and a power switch (not shown) provided on the part of the camera is closed simultaneously. During the initial phase of closure, the power switch experiences mechanical oscillations, which cause a chattering of the switch contacts. As a consequence, the electromagnet 6 is repeatedly turned on and off, producing a sawtooth-shaped back e.m.f. signal $W_0$ having a magnitude on the order of $-60$ V. When the power switch assumes a stable on position, the electromagnet 6 remains in a stabilized energized condition, and the element 4 initiates its photometric operation under this condition. At this time, a first shutter blind 9 will have passed across a film surface 8 to maintain it exposed, as shown in FIG. 3 while a second shutter blind 10 is held in its starting position by means of the electromagnet 6. In FIG. 3, the terminal position at which the first blind 9 remains stationary is indicated by position $B'_1$ of its trailing edge $9a$ while the starting position of the second blind 10 is indicated by position $B_2$ of its leading edge $10a$. When the shutter blinds 9, 10 assume the positions $B'_1$, $B_2$, respectively, the synchro contacts 22 (see FIG. 4) are closed and hence a flashlight illumination is produced by the discharge tube 20 at time X as shown in FIG. 2(A), the profile of the flashlight illumination being indicated by a curve $W_1$.

When the element 4 determines that a proper exposure is reached, the shutter control system 5 produces a signal to deenergize the electromagnet 6, whereupon the second blind 10 is freed to run. The second blind 10 begins to run from the starting position $B_2$ and reaches a stable position after running through an initial distance e. It begins to cover the film surface 8 at a position $B'_2$, and continues to run to cover the film surface 8 completely, and finally stops while maintaining the film surface 8 covered. Normally, the synchro contacts 22 are designed to be closed when the first blind 9 reaches the position $B'_1$ and when the second blind 10 is located between the positions $B_2$ and $B'_2$.

Assuming that the electromagnet 6 is deenergized at time $1/Z$, a strobo interrupt signal $W_2$ shown in FIG. 2(A) is produced by the back e.m.f. to the terminal $A_1$ as the electromagnet 6 is deenergized, thus interrupting the flashlight illumination of the strobo unit. It will thus be seen that the strobo interrupt signal is produced after the synchro contacts 22 are closed to apply a circuit voltage to the transistor 30. Hence, the interrupt signal renders the transistor 30 conductive, whereby thyristor 27 is fired to cause the conduction of the extinction discharge tube 24, thereby interrupting the flashlight illumination. After the strobo interrupt signal is produced, a signal $L_0$ of a low voltage on the order of $-2.5$ V is applied to the terminal $A_1$ of the strobo unit AS from a power source contained in the camera during the time the power switch remains closed after the electromagnet 6 is deenergized, as shown in FIG. 2(A).

Referring to FIG. 2(B) to describe a shutter operation which takes place with an exposure period of 1/60 second, very close to the time X utilized during a strobo photographing operation, the element 4 will indicate a proper exposure 1/60 second after the initiation of running of the first blind 9, thereby causing the shutter control system 5 to produce a deenergize signal to be applied to the electromagnet 6, followed by a strobo interrupt signal $W_3$. At the time of 1/60 second after $t_0$ when the electromagnet deenergize signal and the strobo interrupt signal are produced, the first blind 9 generally still continues to run and the trailing edge $9a$ will be running at position $B_1$ as shown in FIG. 3. The first blind 9 will reach the position $B'_1$ when the second blind 10 is freed for running at its initial position $B_2$ to run until its leading edge $10a$ reaches the position $B'_2$. At this time, namely, at time $X'$ second, the film surface 8 is fully exposed, and the synchro contacts 22 are closed to provide a flashlight illumination as indicated by a curve $W'_1$ during the time the first shutter blind $9a$ is at position $B'_1$ and the second shutter blind $10a$ is between positions $B_2$ and $B'_2$. As to the detailed construction of such X-contact operation, it may be seen in U.S. Pat. No. 3,987,468, for example. This flashlight illumination is produced independently from the fact that a proper exposure as determined by the element 4 is already reached, and is therefore unnecessary. Since the strobo interrupt signal $W_3$ has been already produced, there is no longer means available which can be utilized to block the flashlight illumination, resulting in a full cycle of the flashlight illumination. Since this illumination occurs during the time the film surface 8 is entirely exposed, the unfavorable result will be evident. Thus it will be seen that there must be provided some means other than the strobo interrupt signal $W_3$ which can be utilized to interrupt the flashlight illumination during the time the synchro contacts 22 are closed.

It will be most desirable to utilize a low voltage signal $L_0$ which is supplied from the camera to the terminal $A_1$ subsequent to the strobo interrupt signal $W_3$, as a strobo blocking signal. When the signal is so utilized, the transistor 30 can be rendered conductive immediately when the synchro contacts 22 are closed. Specifically, the transistor 30 is supplied with a circuit voltage in response to the closure of the synchro contacts 22, and is also supplied with a strobo blocking signal $L_0$ of a low voltage, and is hence immediately rendered conductive to fire the thyristor 27. This causes the conduction of the extinction discharge tube 24 to block the flashlight illumination.

Referring to FIG. 2(C), there is illustrated a more rapid shutter operation which takes place with an exposure period of 1/125 second. In this instance, after the running of the first shutter blind 9 is initiated, the second shutter blind 10 will be freed from the electromagnet 6 to initiate the running before the first blind 9 comes to a stop. As a consequence, the synchro contacts 22 cannot be closed during the shutter operation. However, as the electromagnet 6 is deenergized, the back e.m.f. developed thereacross produces a strobo interrupt signal $W_4$ shown in FIG. 2(C) to the terminal $A_1$ at time of 1/125 second, for example. The high voltage signal $W_4$ often erroneously renders transistor 30 conductive even though the circuit voltage is not applied thereto, thus firing thyristor 27 to discharge the capacitor 26. This causes an inconvenience that the thyristor 23 cannot be reversed biased at the next time a picture is taken. With certain cameras in which a thyristor such as thyristor 27 is used in place of the synchro contacts, the strobo interrupt signal of high voltage may cause a flashlight illumination when it is undesirable.

The described inconvenience can be avoided by removing the strobo interrupt signal as a noise when the synchro contacts 22 are not closed or when no circuit voltage is applied to the transistor 30. This also brings forth the advantage that the back e.m.f. signal $W_0$ which occurs during the time the power switch is turned on can be completely eliminated as noise.

It will be seen from the foregoing description that the signal system of the type described must be capable of accepting signals of substantially different magnitude when the circuit voltage is applied as illustrated by FIGS. 2(A) and (B) and capable of rejecting at least high voltage signal as noise when no circuit voltage is applied as illustrated in FIG. 2(C).

With the conventional strobo circuit as illustrated in FIG. 4, a negative signal applied to the input terminal $A_1$ from the camera will find a path including resistor $R_2$, the gate of thyristor 27, its cathode, resistor $R_3$, the emitter and base of transistor 30, diode 31 and resistor $R_5$. The current flow across the terminals $A_1$ and $B_1$ when a circuit voltage is applied to the transistor 30 will be different from a corresponding current flow when no circuit voltage is applied to the transistor 30. Denoting the current flow across the terminals $A_1$-$B_1$ when no circuit voltage is applied to the transistor 30 by $I_\alpha$ and that when circuit voltage is applied to the transistor 30 by $I_\beta$, they can be given by the following approximations:

$$I_\alpha = \frac{V_{AB}}{R_2 + R_3 + R_5}, \quad I_\beta = \frac{V_{AB}}{R_5 + H_{FE}(R_2 + R_3)}$$

where $V_{AB}$ represents the voltage across the terminals $A_1$-$B_1$ and $H_{FE}$ the amplification factor of the transistor 30. When the circuit parameters are chosen so that the thyristor 27 can be turned on by a low voltage signal on the order of $-2.5$ V when the circuit voltage applied to the transistor 30 is available, by choosing $H_{FE}$ equal to 100, the resistance of resistors $R_2$, $R_3$ and $R_5$ equal to 1 K$\Omega$, 100$\Omega$ and 30 K$\Omega$, respectively, the current flow will be estimated as follows:

$$I_\alpha \approx \frac{V_{AB}}{31K\Omega}, \quad I_\beta = \frac{V_{AB}}{140K\Omega},$$

and the ratio therebetween will be as follows:

$$I_\alpha : I_\beta = 9:2$$

Thus, $I_\alpha$ may be as great as 4.5 times the magnitude of $I_\beta$. This makes it difficult to remove a high voltage signal on the order of $-90$ V as a noise when no circuit voltage is applied to the transistor 30. Thus it will be seen that the conventional circuit described above fails to provide a required signal selection by mere choice of the circuit parameters.

SUMMARY OF THE INVENTION

It is an object of the invention to provide a signal system which overcomes the problems described above, by utilizing a field effect transistor.

In accordance with the invention, a signal system including a switching element which is turned on and off in response to an electrical signal comprises a field effect transistor which is arranged so that its drain current does not vary in response to a variation in the voltage across the source and drain thereof, whereby every signal is supplied to the switching element when a circuit voltage is applied thereto while no signal is permitted to be supplied to the switching element when no circuit voltage is applied thereto. With the arrangement of the invention, the use of the field effect transistor enables a reliable determination of two kinds of signals having a low and a high magnitude.

DESCRIPTION OF PREFERRED EMBODIMENTS

Figure 4:
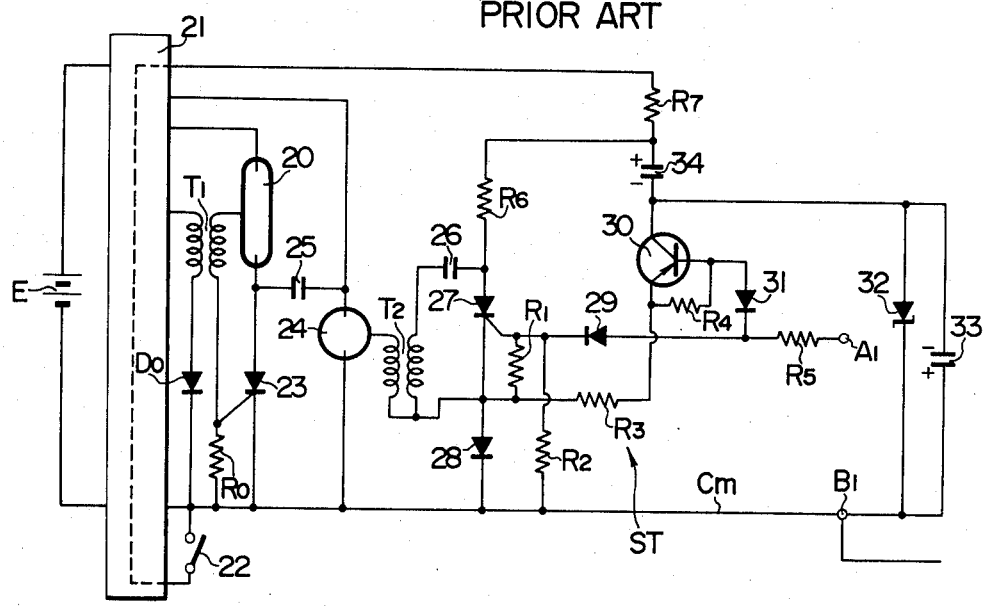
FIG. 4 is a circuit diagram of a conventional strobo control circuit.
Figure 5:
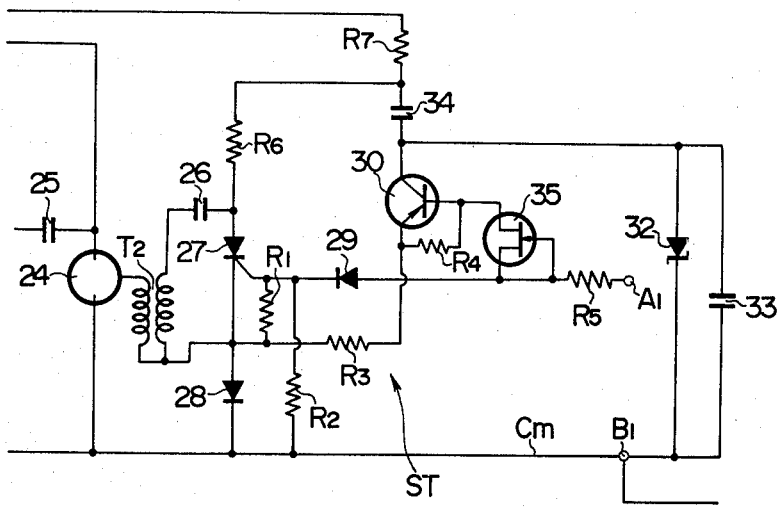
FIG. 5 is a circuit diagram of a strobo control circuit according to one embodiment of the invention.
Figure 6:
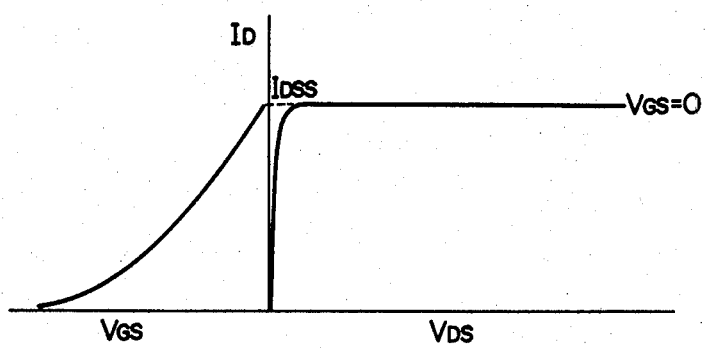
FIG. 6 graphically shows the characteristic of a field effect transistor.
Figure 7:
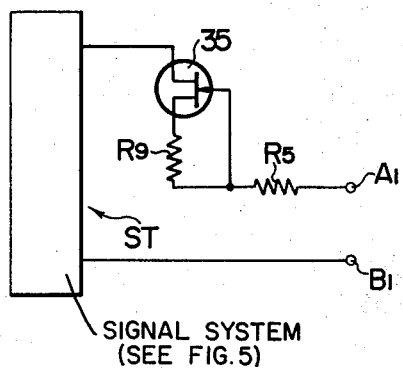
FIG. 7 is a circuit diagram of another embodiment of the invention.

Referring to FIGS. 5 to 7, several embodiments of the invention will be described. It is to be noted that components similar to those shown in FIG. 4 are designated by like reference characters and will not be specifically described. In FIG. 5, it will be noted that the general circuit arrangement is substantially similar to that shown in FIG. 4 except that the diode 31 of FIG. 4 is replaced by a field effect transistor 35. The transistor 35 has its drain connected with the base of transistor 30, and its source connected with the signal input terminal $A_1$ through the resistor $R_5$. The gate of the transistor 35 is connected with the source. A field effect transistor has a drain current $I_D$ which is illustrated in FIG. 6. As shown, the drain current varies with the voltage $V_{GS}$ across the gate and the source, but does not vary with the voltage $V_{DS}$ across the drain and the source. As a consequence, when $V_{GS}=0$, $I_D=I_{DSS}$, which represents a maximum drain current. When a negative signal is applied to the terminal $A_1$ in the absence of a circuit voltage applied to the transistor 30 or before the synchro contacts are closed, as illustrated in FIG. 2(C), the path across the terminals $A_1$-$B_1$ is closed through resistor $R_2$, the gate and cathode of thyristor 27, resistor $R_3$, the emitter and base of transistor 30, the drain and source of the field effect transistor and resistor $R_5$. In this manner, the drain-source path of the field effect transistor is included in the signal path. Since the drain current $I_D$ of the field effect transistor does not vary with the voltage $V_{DS}$ across the drain and source, it is limited to the maximum drain current $I_{DSS}$ irrespective of any magnitude of the voltage across the terminals $A_1$, $B_1$. As a consequence, by choosing a field effect transistor which satisfies the inequality requirement $I_\beta < I_{DSS} < I_\alpha$ (or $I_\beta:I_\alpha=1:100$) to prevent the thyristor 27 from being turned on with the current $I_{DSS}$, a voltage of any high magnitude can be eliminated as noise if it occurs before the synchro contacts are closed.

Figure 1:
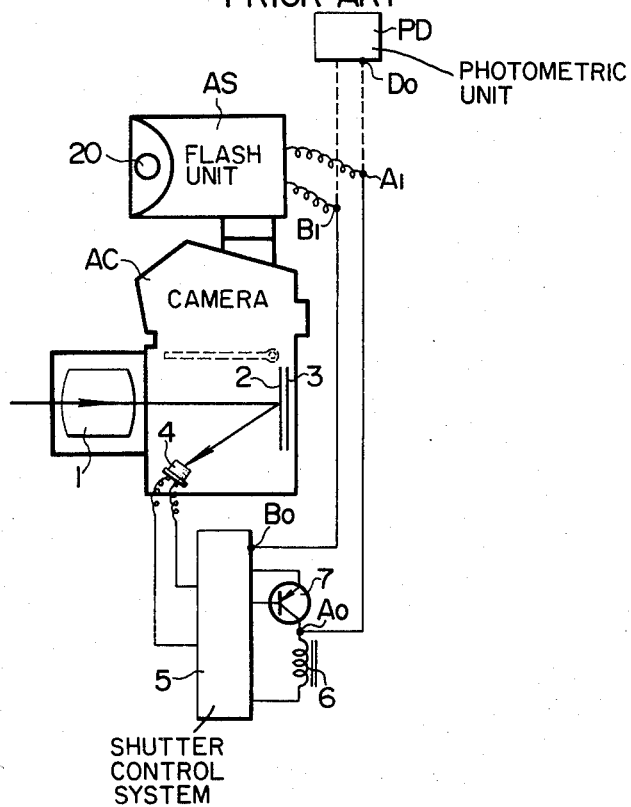
FIG. 1 is a schematic side elevation of one exemplary auto strobo unit combined with a camera of automatic exposure type to which the invention may be applied.
Figure 3:
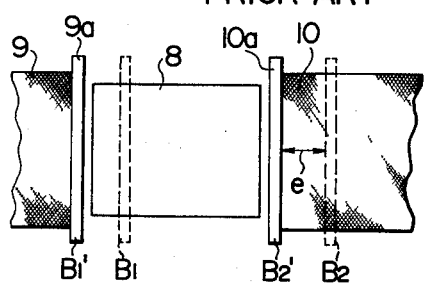
FIG. 3 is a schematic front view, illustrating the manner of operation of a first and a second shutter blind.
Figure 2A:
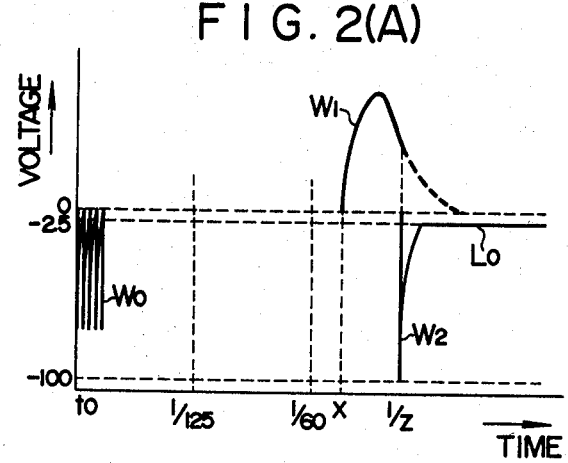
FIGS. 2(A), (B) and (C) graphically illustrate a signal produced in the arrangement of FIG. 1 during different modes of operation.
Figure 2B:
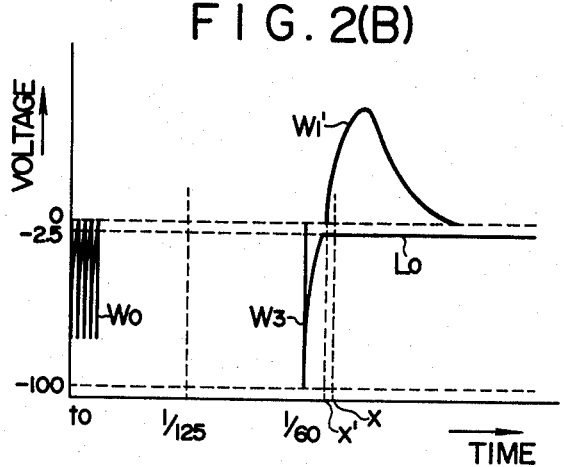
Figure 2C:
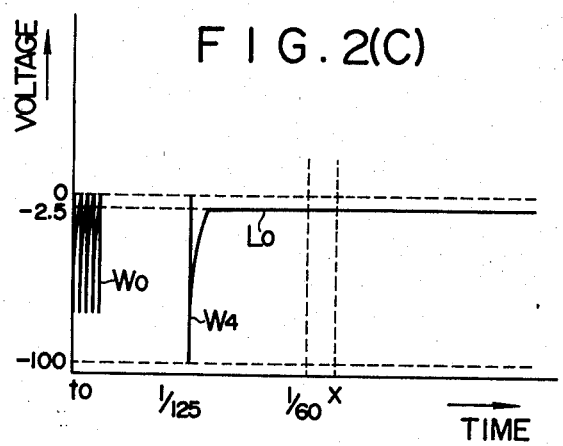

On the other hand, when a circuit voltage is applied to the transistor 30 or simultaneously with or after the closure of the synchro contacts, as illustrated by the waveforms of FIGS. 2(A) and (B), the field effect transistor serves as a simple resistor, and the magnitude of $I_\beta$ is not limited by the drain current $I_{DSS}$ of the field effect transistor. Consequently, the amplification by the transistor 30 is effective to enable thyristor 27 to be turned on with $I_\beta$.

Stated differently, in the absence of the circuit voltage applied to the transistor 30 (FIG. 2(C)), the current limiting action by the FET transistor 35 is effective to remove any high voltage signals to the thyristor 27 as noise. However, in the presence of a circuit voltage applied to the transistor (see FIGS. 2(A) and (B)), the amplification by the transistor 30 permits both a low voltage signal and a high voltage signal to be accepted as significant input signals. In this manner, any inadvertent operation of the signal system can be reliably prevented.

FIG. 7 shows a modification in which resistor $R_9$ is connected between the gate and the source of the transistor 35 when it is desired to vary the magnitude of the drain current.

What is claimed is:

1. A signal system for controlling a switching element in response to a selectively applied switching signal, said switching element having first and second terminals and a control input, said switching element having a conductive path established between said control input and one of said first and second terminals responsive to said switching signal, said switching element requiring a control input signal exceeding a predetermined value applied to said control input to cause conduction between said first and second terminals, said signal system comprising:

input means for receiving said selectively applied switching signal;

circuit means for coupling said selectively applied switching signal from said input means to said conductive path normally established between said control input and said one of said first and second terminals of said switching element to establish a signal path therebetween;

transistor means having a signal receiving input and first and second electrodes, said signal receiving input and said first electrode of said transistor means being connected to said signal path established by said circuit means;

means for selectively supplying a bias voltage to the second electrode of said transistor means, said transistor means acting upon an application of said bias voltage to limit the magnitude of current between said first electrode and said signal receiving input, said transistor means acting absent the application of said bias voltage to conduct current of increased magnitude between said signal receiving means and said first electrode;

field effect transistor means having a gate electrode and a drain and a source providing a drain to source signal path, said drain to source signal path being connected between said input means and the said signal receiving input of said transistor means, and current controlling means coupled between said gate electrode and said source for limiting the magnitude of current in said drain to source signal path to a value which is less than said predetermined value of said control input signal necessary to cause said switching element to conduct, to prevent signals applied to said input means from rendering said switching element conductive absent the application of said bias voltage to said transistor means.

2. A signal system according to claim 1 wherein said current controlling means further includes a resistor connected between said gate and said source for limiting the magnitude of current in said drain to source signal path.

3. The signal system according to claim 1 wherein said transistor means signal receiving input and first and second electrodes respectively comprises base, emitter and collector electrodes;

one of said source and drain being connected to the base electrode of said transistor means;

said gate electrode being connected with the remaining one of said source and drain; and said input means including means connected to said gate electrode for applying said switching signal to control the switching of said switching element.

4. The apparatus according to claim 1 wherein said switching element comprises a thyristor; said first and second terminals and said control input respectively comprising cathode, anode and gate electrodes of said thyristor, said cathode and gate electrodes coupled respectively to said transistor means and said field effect transistor means.

* * * * *

UNITED STATES PATENT AND TRADEMARK OFFICE
CERTIFICATE OF CORRECTION

PATENT NO. : 4,239,984
DATED : December 16, 1980
INVENTOR(S) : Isao Kondo

It is certified that error appears in the above—identified patent and that said Letters Patent is hereby corrected as shown below:

Column 1, line 16, change "strobe" to --strobo--.

Column 6, line 23, change "signals" to --signal--.

Signed and Sealed this

Seventh Day of April 1981

[SEAL]

Attest:

RENE D. TEGTMEYER

*Attesting Officer*     *Acting Commissioner of Patents and Trademarks*